United States Patent [19]

Daly et al.

[11] Patent Number: 4,685,765

[45] Date of Patent: Aug. 11, 1987

[54] OPTICAL FIBRE JOINT

[75] Inventors: Michael J. Daly, Manchester; David T. Parr, Croft, Nr. Warrington, both of England

[73] Assignee: BICC Public Limited Company, London, England

[21] Appl. No.: 606,662

[22] Filed: May 3, 1984

[30] Foreign Application Priority Data

May 5, 1983 [GB] United Kingdom ................. 8312313

[51] Int. Cl.⁴ ............................................... G02B 6/36
[52] U.S. Cl. ................................. 350/96.21; 350/96.23
[58] Field of Search ........................... 350/96.21, 96.23

[56] References Cited

U.S. PATENT DOCUMENTS

| 4,109,994 | 8/1978 | Chown | 350/96.21 |
| 4,132,461 | 1/1979 | Jacques et al. | 350/96.20 |
| 4,166,670 | 9/1979 | Ramsay | 350/96.23 |
| 4,201,444 | 5/1980 | McCartney et al. | 350/96.21 |
| 4,220,619 | 9/1980 | Kersten | 350/96.21 |
| 4,447,122 | 5/1984 | Sutehall | 350/96.23 |
| 4,490,007 | 12/1984 | Murata | 350/96.21 |

FOREIGN PATENT DOCUMENTS

| 0100744 | 8/1979 | Japan | 350/96.23 |
| 584110 | 6/1981 | Japan | 350/96.23 |
| 2022859 | 12/1979 | United Kingdom | 350/96.23 |
| 1569676 | 6/1980 | United Kingdom | 350/96.21 |

OTHER PUBLICATIONS

"Optical Waveguide Cable Connection", by Thiel et al, Applied Optics, vol. 15, No. 11, Nov. 1976, (pp. 2785-2791).

Primary Examiner—William L. Sikes
Assistant Examiner—Akm E. Ullah
Attorney, Agent, or Firm—Anthony J. Casella; Gerald E. Hespos

[57] ABSTRACT

A simple and inexpensive optical fibre joint comprises an elongate core consisting of an assembly of rods defining between their adjacent radially outer surfaces a plurality of interstices; an elastomeric sleeve tightly surrounding the core; and two optical fibres aligned in one of the interstices with their neighboring end faces abutting or closely spaced apart. The depth of the interstice and the degree of expansion of the elastomeric sleeve having regard to the diameters of the aligned optical fibres are such that the optical fibres are tightly held in the interstice. The rods constituting the elongate core may be of rigid material or of an elastomeric material.

11 Claims, 3 Drawing Figures

OPTICAL FIBRE JOINT

This invention relates to jointing of aligned optical fibres and is especially, but not exclusively, concerned with jointing of optical fibres of the kind employed in optical cables for use in cable television installations.

It is an object of the present invention to provide a simple and inexpensive optical fibre joint which can be readily effected in the field by semi-skilled personnel.

According to the invention the improved optical fibre joint comprises an elongate core consisting of at least two elongate members assembled together, the members, or where there are more than two members at least two adjacent members, being of such transverse cross-section that adjacent radially outer parts of surfaces of said adjacent members define between said parts an interstice which extends lengthwise of the core; a sleeve of elastomeric material so tightly surrounding the core that the sleeve is in a stretched condition; and two optical fibres aligned in the interstice with their neighbouring end faces abutting or closely spaced apart, the interstice being of such depth and the elastomeric sleeve being so stretched having regard to the diameters of the optical fibres that the aligned optical fibres are tightly held in the interstice.

Each elongate member may be of any convenient transverse cross-section but, preferably, each elongate member is of substantially circular transverse cross-section, the elongate members being of substantially identical diameters. In a preferred embodiment, the elongate core comprises four elongate members each of substantially circular transverse cross-section, assembled together. If desired, a plurality of elongate members, each of which may be of substantially circular transverse cross-section, may be assembled around and substantially parallel to a central elongate member.

In all cases, each of the elongate members preferably is of a material having a low temperature co-efficient of expansion and preferably, also, that is not affected detrimentally by contact with an index matching fluid which may be injected into the interstice or with which the ends of the optical fibres may be coated before they are positioned in the interstice.

Where the optical fibres to be jointed are multimode optical fibres, preferably each of the elongate members is of a substantially rigid and non-compressible material; in this case, each of the members may be of metal or non-metal but, preferably, it is of polyethylene teraphthalate. Where the optical fibres to be jointed are monomode optical fibres, or any other optical fibres where a high degree of accuracy is required in aligning the cores of the optical fibres, preferably each of the elongate members is of an elastomeric material, such as natural and synthetic rubbers.

Where the elongate core comprises two or more elongate members of elastomeric material assembled together, in some circumstances at least some of these elongate members may be integral with the sleeve of elastomeric material.

The surrounding sleeve of elastomeric material is preferably of polychloroprene rubber, high strength silicone rubber, modified nitrile rubber or fluorosilicone rubber, but any elastomeric material may be employed that is not affected detrimentally by contact with an index matching fluid.

The sleeve preferably has a length which is several times its overall diameter, for example 2 to 10 times its overall diameter, and the elongate core preferably protrudes from each end of the sleeve and preferably has a length lying in the range 1.25 to 1.75 times the length of the sleeve.

Preferably, the improved optical fibre joint is housed in a casing of substantially rigid material and, preferably, integral with or connected to the casing are means for detachably connecting the casing to a substantially rigid support. For example, the casing may have legs which effect snap fits in holes or recesses in the surface of a substantially rigid supporting structure.

The improved optical fibre joint is stable over a temperature range of $-40°$ C. to $+70°$ C., can be effected on optical fibres having a core size within a wide range with a loss not exceeding 0.5 dB, can be readily disconnected and reassembled, can be used to joint optical fibres whose buffer coatings have not been removed and is especially suitable for use in jointing of optical fibres employed in cable television installations.

The invention also includes a method of making the improved optical fibre joint hereinbefore described.

The invention is further illustrated by a description, by way of example, of two preferred forms of optical fibre joint with reference to the accompanying drawings, in which.

Figure 1:
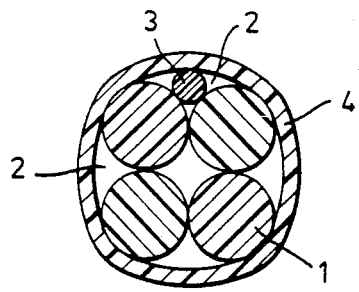
FIG. 1 is a transverse cross-sectional view of one preferred optical fibre joint drawn on a greatly enlarged scale.
Figure 2:
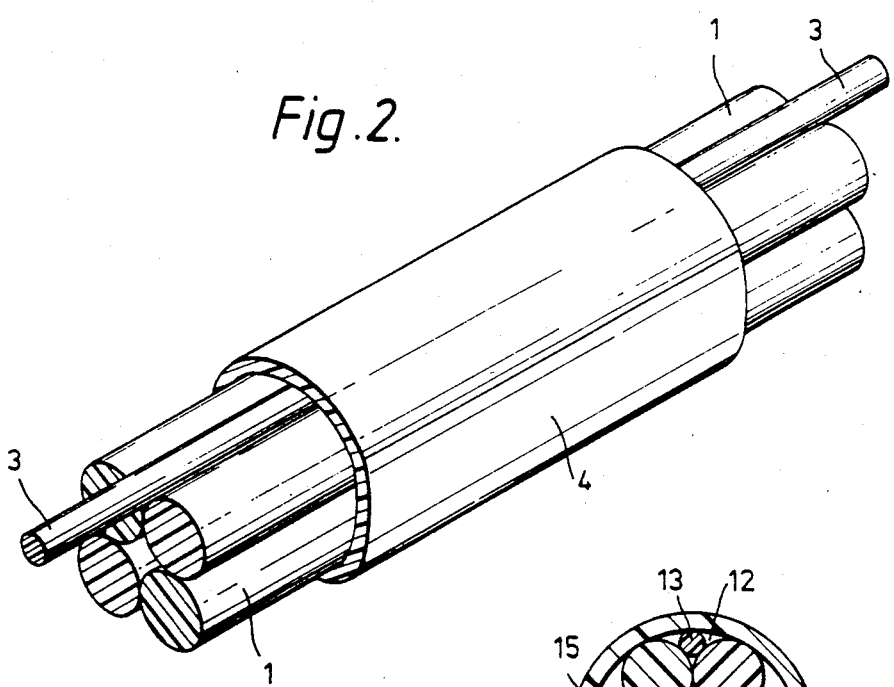
FIG. 2 is a perspective view of the optical fibre joint shown in FIG. 1.

Referring to FIGS. 1 and 2, the first preferred form of optical fibre joint comprises four rods 1 of polyethylene teraphthalate, each of a substantially circular transverse cross-section having a diameter of 0.8 mm and a length of 26 mm, assembled together to form an elongate core having four interstices 2. Aligned in one of the interstices 2, are two buffer coated optical fibres 3 of diameter 250 mm which are so positioned relative to one another that their neighbouring end faces abut. If desired, prior to introduction into the interstice 2, an index matching fluid may be injected into the interstice or end parts of the optical fibres 3 may be coated with an index matching fluid before the optical fibres are positioned in the interstice. A sleeve 4 of neoprene having a length of 20 mm and an internal diameter in the unstretched condition of 1.5 mm so tightly surrounds an intermediate portion of the assembly of rods 1 and the aligned optical fibres 3 that the sleeve is in a stretched condition and tightly holds the aligned optical fibres in the interstice 2, end parts of the rods protruding from opposite ends of the sleeve 4. The stretched sleeve 4 has an outer diameter of approximately 3 mm.

Figure 3:
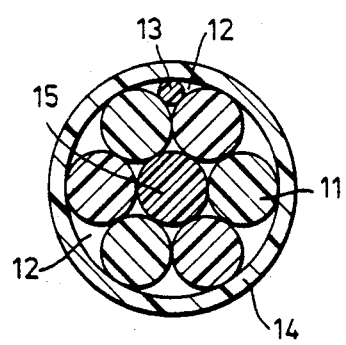
FIG. 3 is a transverse cross-sectional view of the second preferred form of optical fibre joint drawn on a greatly enlarged scale.

In the second preferred form of optical fibre joint shown in FIG. 3, the elongate core comprises six rods 11 of polyethylene terphthalate, each of a substantially circular transverse cross-section, assembled around and substantially parallel to a central rod 15 of polyethylene terphthalate of a circular transverse cross-section of diameter the same as that of rods 11. Adjacent radially outer parts of the surfaces of the rods 11 define between them interstices 12 in which aligned optical fibres can be tightly held. Two optical fibres 13, each having a buffer coating, are aligned in one of the interstices 12 with their neighbouring end faces abutting and a sleeve 14 of elastomeric material so tightly surrounds the assembly of rods 11 and 15 and the aligned optical fibres 13 that the sleeve is in a stretched condition. The depth of the interstice 12 and the degree of extension of the elastomeric sleeve 14 having regard to the diameters of the optical fibres 13 are such that the aligned optical fibres are tightly held in the interstice.

By virtue of the fact that the improved optical fibre joints can employ as the elongate cores readily available rods of appropriate circular cross-section and readily available sleeves of elastomeric material, an improved optical fibre joint of the present invention is substantially less expensive than optical fibre joints hitherto proposed and used.

What we claim as our invention is:

1. An optical fibre joint comprising an elongate core consisting of at least two elongate members assembled together, at least two of said elongate members being of such transverse cross-sections that adjacent radially outer parts of surfaces of said adjacent members define between said parts an interstice which extends lengthwise of the core; a sleeve of elastomeric material so tightly surrounding the core that the sleeve is in a stretched condition; and two optical fibres aligned in the interstice with their neighbouring end faces in close proximity, the interstice being of such a depth and the elastomeric sleeve being so stretched, having regard to the diameters of the optical fibres, that the aligned optical fibres are tightly held in the interstice and against the two elongate members defining the interstice by the elastomeric sleeve.

2. An optical fibre joint as claimed in claim 1, wherein each elongate member is of substantially circular transverse cross-section, the members being of substantially identical diameters.

3. An optical fibre joint as claimed in claim 2, wherein the elongate core comprises four elongate members each of substantially circular transverse cross-section assembled together.

4. An optical fibre joint as claimed in claim 1, wherein a plurality of elongate members are assembled around and lie substantially parallel to a central elongated member.

5. An optical fibre joint as claimed in claim 4, wherein each of the plurality of elongate members is of substantially circular transverse cross-section, the members being of substantially identical diameters.

6. An optical fibre joint as claimed in claim 1, wherein each of the elongate members is of a material having a low temperature coefficient of expansion.

7. An optical fibre joint as claimed in claim 1, wherein each of the elongate members is of a material that is not affected detrimentally by contact with an index matching fluid.

8. An optical fibre joint as claimed in claim 1, wherein each of the elongate members is of a substantially rigid and non-compressible material.

9. An optical fibre joint as claimed in claim 1, wherein each of the elongate members is of an elastomeric material.

10. An optical fibre joint as claimed in claim 9, wherein each of the elongate members is of an elastomeric material, at least some of the elongate members being integral with the sleeve of elastomeric material.

11. An optical fibre joint as claimed in claim 1, wherein the sleeve has a length which is several times its overall diameter and the elongate core protrudes from each end of the sleeve and has a length lying in the range 1.25 to 1.75 times the length of the sleeve.

* * * * *